(12) United States Patent
Inatomi et al.

(10) Patent No.: US 6,731,099 B2
(45) Date of Patent: May 4, 2004

(54) DC-DC CONVERTER WITH CONTROL CIRCUIT CAPABLE OF GENERATING STEP-UP AND STEP-DOWN SIGNALS

(75) Inventors: Koichi Inatomi, Kasugai (JP); Ryuta Nagai, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/083,592

(22) Filed: Feb. 27, 2002

(65) Prior Publication Data

US 2002/0121887 A1 Sep. 5, 2002

(30) Foreign Application Priority Data

Mar. 5, 2001 (JP) ........................................ 2001-060569

(51) Int. Cl.[7] ............................ G05F 1/613; G05F 1/618
(52) U.S. Cl. ........................ 323/284; 323/271; 323/282
(58) Field of Search ............................... 323/271, 274, 323/282, 284, 285

(56) References Cited

U.S. PATENT DOCUMENTS

| | | | | | |
|---|---|---|---|---|---|
| 5,289,359 | A | * | 2/1994 | Ziermann | 363/21.11 |
| 5,402,060 | A | * | 3/1995 | Erisman | 323/268 |
| 5,949,224 | A | * | 9/1999 | Barkaro | 323/282 |
| 6,049,471 | A | * | 4/2000 | Korcharz et al. | 363/20 |
| 6,087,816 | A | * | 7/2000 | Volk | 323/282 |

* cited by examiner

*Primary Examiner*—Bao Q. Vu
(74) *Attorney, Agent, or Firm*—Arent Fox PLLC

(57) ABSTRACT

A control circuit of a DC—DC converter including a switch circuit, which outputs a step-down control signal or a step-up control signal in response to a switching signal, and a switching signal generation circuit, which is connected to the switch circuit to generate the switching signal using a duty setting signal. The switching signal generation circuit decreases the number of external terminals in a semiconductor device having the control circuit.

16 Claims, 8 Drawing Sheets

DC-DC CONVERTER WITH CONTROL CIRCUIT CAPABLE OF GENERATING STEP-UP AND STEP-DOWN SIGNALS

BACKGROUND OF THE INVENTION

The present invention relates to a DC—DC converter, and more particularly, to a DC—DC converter in various types of electronic devices.

A DC—DC converter includes a step-down circuit, which generates a DC output voltage that is lower than a power supply voltage, and a step-up circuit, which generates a DC output voltage that is higher than the power supply voltage. The DC—DC converter further includes a control circuit for receiving a switching signal from an external device to switch the operational mode from a step-up operation to a step-down operation or from a step-down operation to a step-up operation. The DC—DC converter must have an external terminal to receive the switching signal. Accordingly, it is difficult to reduce the size of the DC—DC converter.

Referring to FIG. 1, a step-down DC—DC converter 100 includes a control circuit 1, which is formed on a single semiconductor integrated circuit substrate, and a step-down circuit 2, which includes a plurality of externally connected devices. The control circuit 1 controls the step-down circuit 2 to decrease an input voltage Vin and generate a DC output voltage Vo.

The control circuit 1 includes an error detection amplifier 3, which has a minus input terminal for receiving an output voltage Vo of the step-down circuit 2 and a plus input terminal for receiving a reference voltage VR1. The error detection amplifier 3 amplifies the differential voltage between the output voltage Vo and the reference voltage VR1 and provides the amplified signal to a first plus input terminal of a PWM comparator 4.

A duty setting signal DTC, which is a DC voltage, is provided to a second plus input terminal of the first PWM comparator 4. An oscillation circuit (not shown) provides a triangular wave signal VCT to a minus input terminal of the first PWM comparator 4.

The first PWM comparator 4 compares the output signal of the error detection amplifier 3 or the duty setting signal DTC, whichever one has the lower voltage, with the triangular wave signal VCT. In each cycle of the triangular wave signal, the first PWM comparator 4 generates a comparison output signal SG1 at a low level when the voltage of the triangular wave signal VCT is higher than that of the signal having the lower voltage. When the voltage of the triangular wave signal VCT is lower than that of the signal having the lower voltage, the first PWM comparator 4 generates the comparison output signal SG1 at a high level.

A voltage shift circuit 5 shifts the output signal of the error detection amplifier 3 to a high potential and provides the shifted signal to a plus input terminal of a second PWM comparator 6. A minus input terminal of the second PWM comparator 6 is provided with the triangular wave signal VCT. The second PWM comparator 6 compares the shifted signal and the triangular wave signal VCT. In each cycle of the triangular wave signal VCT, the second PWM comparator 6 generates a comparison signal SG2 at a low level when the voltage of the triangular wave signal VCT is higher than that of the shifted signal and generates the comparison signal at a high level when the voltage of the triangular wave signal VCT is lower than that of the shifted signal.

The comparison output signal SG1 of the first PWM comparator 4 is provided to a switch circuit 8a via an inverter circuit 7a and to a switch circuit 8b. The comparison output signal SG2 of the second PWM comparator 6 is provided to the switch circuit 8b via an inverter circuit 7b and to the switch circuit 8a.

The switch circuits 8a, 8b are provided with a switching signal CH from an external device (not shown) via a terminal T. When the switching signal CH goes low, the switch circuit 8a functions to provide the output signal of the inverter circuit 7a to a drive circuit 9a, and the switch circuit 8b functions to provide the output signal of the inverter circuit 7b to a drive circuit 9b.

The drive circuit 9a is operated by the power provided from a power supply VCC and the ground GND. The drive circuit 9b is operated by the power provided from a power supply VDD and the ground GND. Although the voltage of the power supply VCC is higher than that of the power supply VDD, the two voltages may be the same.

The drive circuit 9a provides its drive output signal to the gate of a p-channel MOS transistor Tr1 in the step-down circuit 2. The drive circuit 9b provides its drive output signal to the gate of an n-channel MOS transistor Tr2 in the step-up circuit 2. In response to the drive signals from the control circuit 1, the transistors Tr1, Tr2 are alternately activated.

The step-down circuit 2 includes the transistors Tr1, Tr2, a diode D1, a coil L1, and a capacitor C1. The alternate activation of the transistors Tr1, Tr2 in the step-down circuit 2 decreases the input voltage Vin and generates a step-down DC output voltage Vo.

In the step-down DC—DC converter 100, with reference to FIG. 3, the duty setting signal DTC is set at a voltage that is higher than the maximum voltage of the triangular wave signal VCT. When the DC output voltage Vo of the step-down circuit 2 decreases, the duty of high level in the comparison signals SG1, SG2, which are generated by the first and second PWM comparators 4, 6, increases. This lengthens the activated time of the transistor Tr1 and shortens the activated time of the transistor Tr2. As a result, the DC output voltage Vo of the step-down circuit 2 increases.

When the DC output voltage Vo of the step-down circuit 2 increases, the duty of high level in the comparison signals SG1, SG2, which are generated by the first and second PWM comparators 4, 6, decreases. This shortens the activated time of the transistor Tr1 and lengthens the activated time of the transistor Tr2. As a result, the DC output voltage Vo of the step-down circuit 2 decreases.

FIG. 2 is a schematic circuit diagram of a step-up DC—DC converter 200 that includes a step-up circuit 10. The step-up circuit 10 is driven by the control circuit 1 and increases an input voltage Vin to generate an output voltage Vo.

When the control circuit 1 is provided with the switching circuit CH at a high level, the drive circuit 9a is provided with the comparison output signal of the second PWM comparator 6 via the switch circuit 8a, and the drive circuit 9b is provided with the comparison output signal of the first PWM comparator 4 via the switch circuit 8b.

The drive circuit 9a provides its drive output signal to the gate of a p-channel MOS transistor Tr3. The drive circuit 9b provides its drive output signal to the gate of an n-channel MOS transistor Tr4. In response to the drive signals from the control circuit 1, the transistors Tr3, Tr4 are alternately activated.

The step-up circuit 10 includes the transistors Tr3, Tr4, a diode D2, a coil L2, and a capacitor C2. The alternating activation of the transistors Tr3, Tr4 in the step-up circuit 10 increases the input voltage Vin and generates a step-up DC output voltage Vo.

In the step-up DC—DC converter 200, with reference to FIG. 4, the duty setting signal DTC is set at a voltage that is lower than the maximum voltage of the triangular wave signal VCT (more specifically, a voltage corresponding to about 70 percent of the amplitude of the triangular wave signal VCT).

When the DC output voltage Vo of the step-up circuit 10 decreases, the duty of high level in the comparison signals SG1, SG2, which are generated by the first and second PWM comparators 4, 6, increases. This shortens the activated time of the transistor Tr3 and lengthens the activated time of the transistor Tr4. As a result, the DC output voltage Vo of the step-up circuit 10 increases.

When the DC output voltage Vo of the step-up circuit 10 increases, the duty of high level in the comparison signals SG1, SG2, which are generated by the first and second PWM comparators 4, 6, decreases. This lengthens the activated time of the transistor Tr3 and shortens the activated time of the transistor Tr4. As a result, the DC output voltage Vo of the step-up circuit 2 decreases.

When an increase in the load of the step-up circuit 10 decreases the DC output voltage Vo, the duty of high level in the comparison output signal SG1 of the first PWM comparator 4 increases. This lengthens the activated time of the transistor Tr4. In this state, the voltage of the duty setting signal DTC is set at a value corresponding to about 70 percent of the amplitude of the triangular wave signal VCT. Thus, the transistor Tr4 does not remain activated. This prevents an overcurrent from damaging the transistor Tr4.

FIG. 5 is a schematic circuit diagram of a control unit 300, which includes two control circuits 80 and which is formed on a single semiconductor integrated circuit substrate.

A soft-start circuit 13 soft-starts a step-up circuit 10 or a step-down circuit 2 when a DC—DC converter is activated. When a load circuit of the DC—DC converter short-circuits, comparators 11a, 11b, AND circuits 12a, 12b, 12c, 12d, and an output short-circuit detection circuit 14 stop step-up or step-down operations. An oscillator 15 generates the triangular wave signal VCT, and a reference voltage generation circuit 16 generates reference voltages VR1, VR3.

In the control unit 300, which has a two channel configuration, each channel must have an external terminal to receive the switching signal CH. In this case, an external terminal having a total of 18 pins is necessary.

As described above, in the control circuits 1 and the control unit 300 of the DC—DC converters, the switching signal CH, which shifts the operational mode between the step-up and step-down operations, must be provided from an external device. Thus, an external terminal for receiving the switching signal CH is necessary. This increases the number of terminals in a semiconductor integrated circuit device that includes the control circuit 1 or the control unit 300. Therefore, it is difficult to produce a smaller device. Further, if a single semiconductor integrated device has a plurality of control circuits, this would further increase the number of external terminals, which receive the switching signal CH, and make it difficult to produce a smaller device.

SUMMARY OF THE INVENTION

It is an object of the present invention to provide a DC—DC converter having less external terminals.

To achieve the above object, the present invention provides a control circuit of a DC—DC converter that generates either one of a step-down control signal and a step-up control signal. The control circuit includes a switch circuit for outputting either one of the step-down control signal and the step-up control signal in response to a switching signal. A switching signal generation circuit is connected to the switch circuit to generate the switching signal using a duty setting signal, which controls either one of the step-down control signal and the step-up control signal.

A further perspective of the present invention is a control circuit of a DC—DC converter including a first PWM comparator for comparing an input signal, a duty setting signal, and a triangular wave signal to generate either one of a first step-down control signal and a first step-up control signal. A second PWM comparator compares the input signal and the triangular wave signal to generate either one of a second step-down control signal and a second step-up control signal. A switch circuit is connected to the first and second PWM comparators to output either the first and second step-down control signals or the first and second step-down control signals in response to a switching signal. A switching signal generation circuit is connected to the switch circuit to generate the switching signal using the duty setting signal.

A further perspective of the present invention is a DC—DC converter including a step-down circuit for decreasing an input voltage to generate a step-down output voltage or a step-up circuit for increasing the input voltage to generate a step-up output voltage. The DC—DC converter includes a control circuit connected to the step-down circuit or the step-up circuit for generating either one of a step-down control signal, which controls the step-down circuit, or a step-up control signal, which controls the step-up circuit. The control circuit includes a switch circuit for outputting either one of the step-down control signal and the step-up control signal in response to a switching signal. A switching signal generation circuit is connected to the switch circuit to generate the switching signal using a duty setting signal, which controls the duty of either one of the step-down control signal and the step-up control signal.

A further perspective of the present invention is a method for controlling a DC—DC converter including a step-down circuit or a step-up circuit. The method includes generating either one of a step-down control signal, which controls the step-down circuit, or a step-up control signal, which controls the step-up circuit. The method also includes generating a switching signal using a duty setting signal, which controls the duty of either one of the step-down control signal and the step-up control signal. The method further includes providing either one of the step-down control signal and the step-up control signal to the associated step-down circuit or step-up circuit in response to the switching signal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
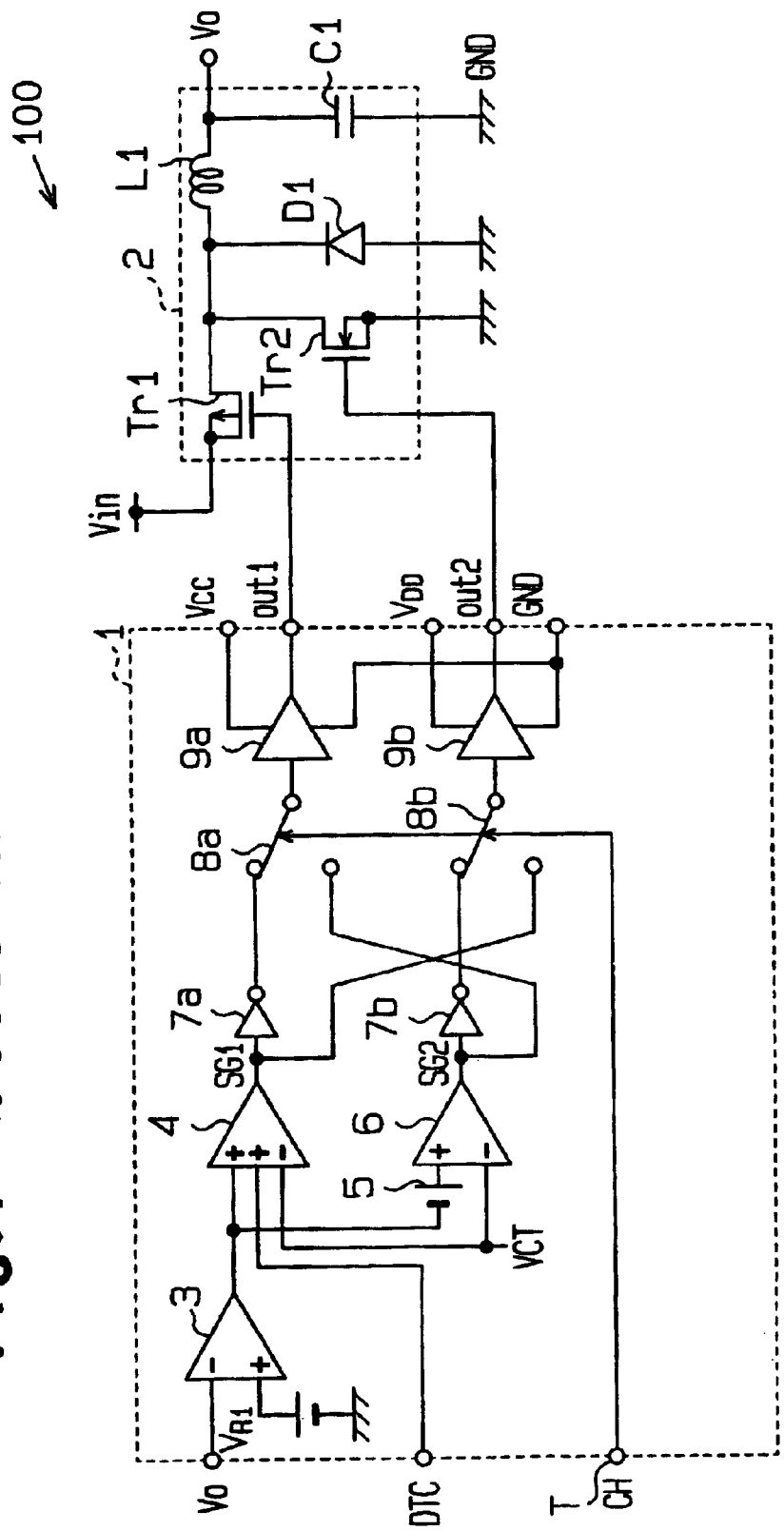
FIG. 1 is a schematic circuit diagram of a prior art step-down DC—DC converter.
Figure 2:
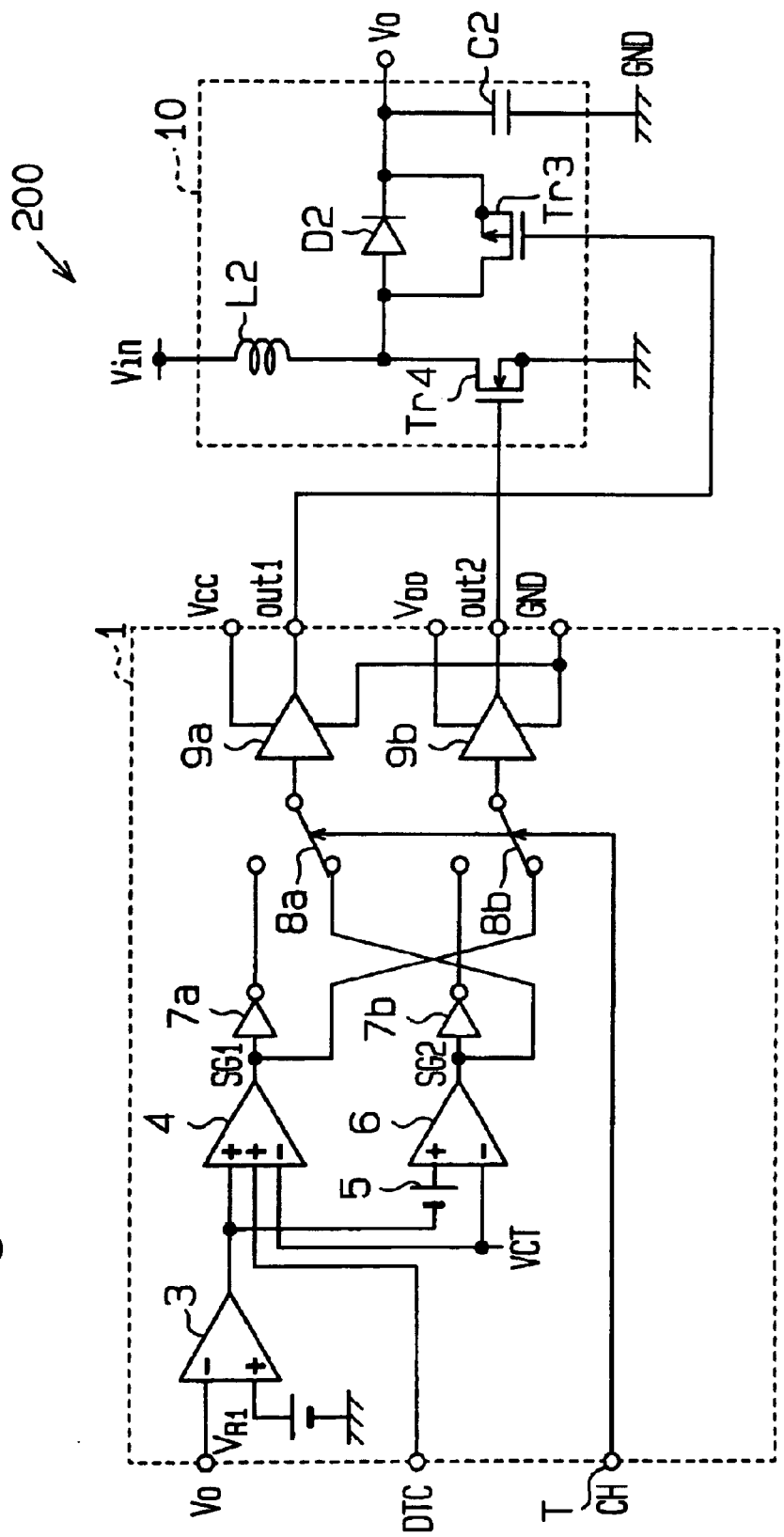
FIG. 2 is a schematic circuit diagram of a prior art step-up DC—DC converter.
Figure 3:
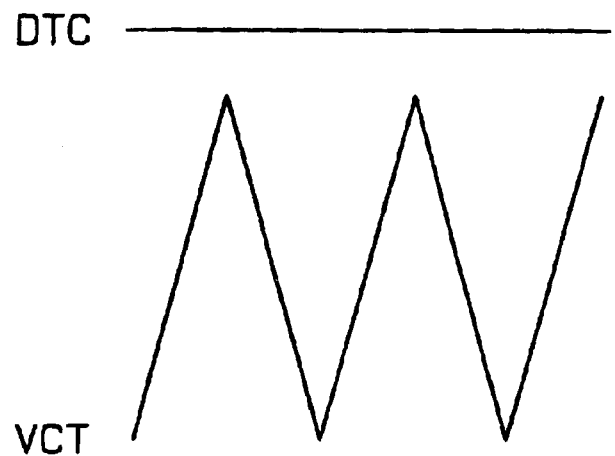
FIG. 3 is a waveform chart of a duty setting signal and a triangular wave signal in the DC—DC converter of FIG. 1.
Figure 4:
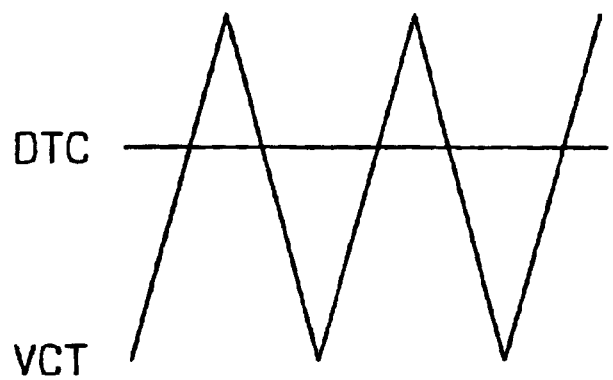
FIG. 4 is a waveform chart of a duty setting signal and a triangular wave signal in the DC—DC converter of FIG. 2.
Figure 5:
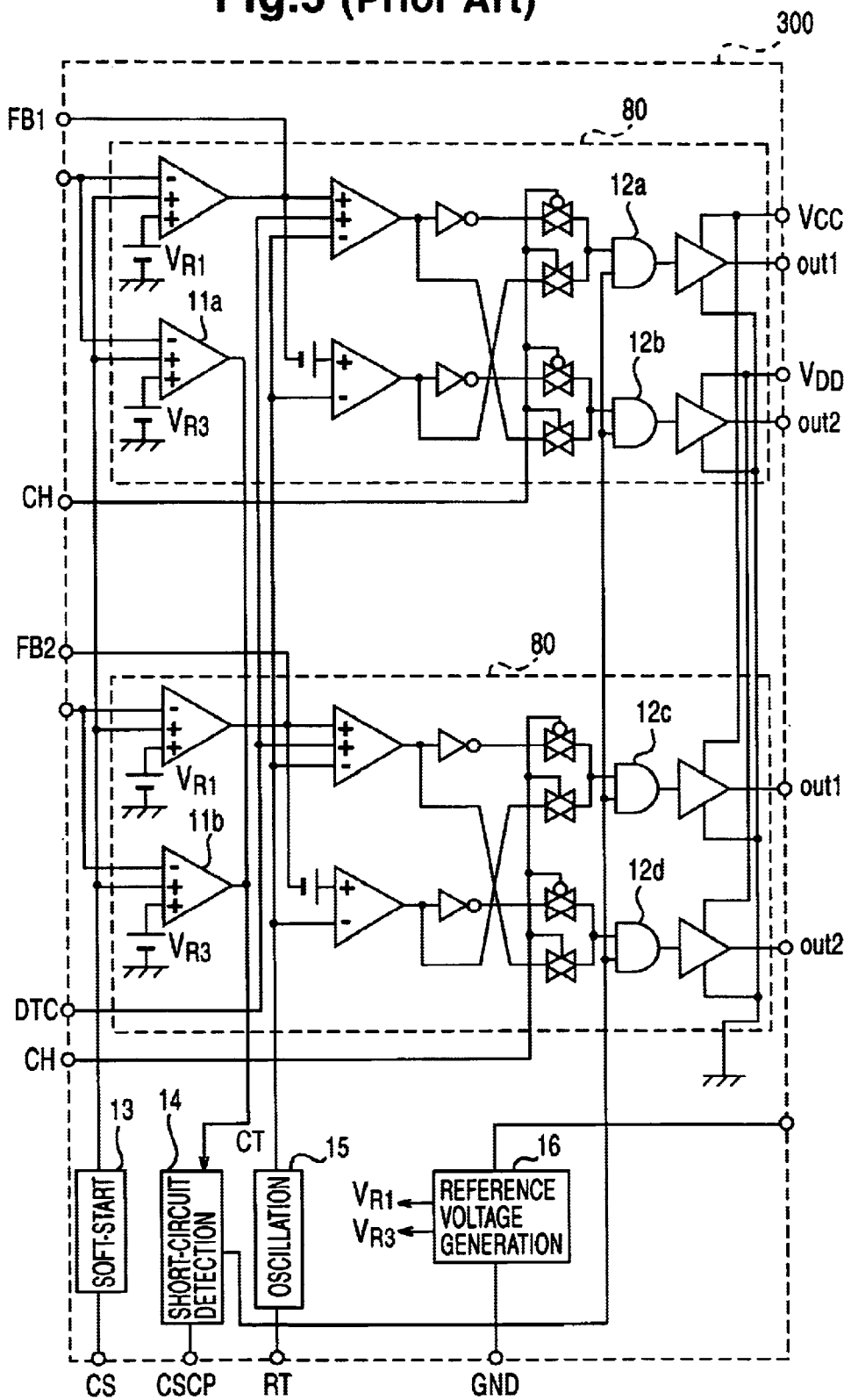
FIG. 5 is a schematic circuit diagram of a control unit of a prior art two channel DC—DC converter.

In the drawings, like numerals are used for like elements throughout.

Figure 6:
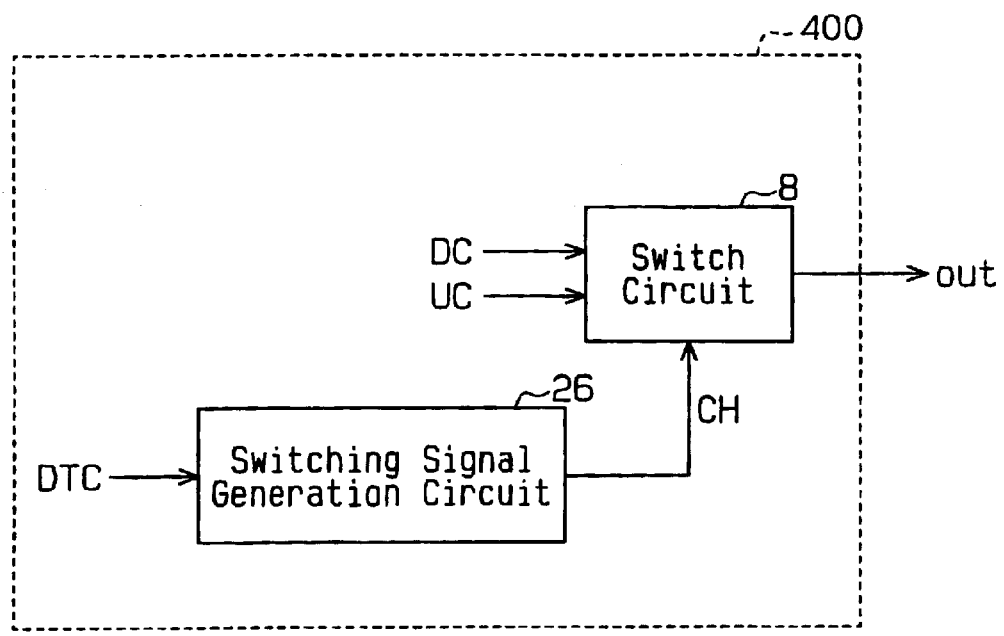
FIG. 6 is a schematic block diagram of a control circuit of a DC—DC converter according to a first embodiment of the present invention.

FIG. 6 is a schematic block diagram illustrating a control circuit 400 of a DC—DC converter according to a first embodiment of the present invention. The control circuit 400 includes a switch circuit 8, which outputs a step-down control signal DC or a step-up control signal UC, as a control output signal out based on a switching signal CH. The control circuit 400 further includes a switching signal generation circuit 26, which uses a duty setting signal DTC to generate the switching signal CH. The duty setting signal DTC controls the duty of the control output signal out. The switching signal generation circuit 26 eliminates the need for an external terminal that receives the switching signal CH.

Figure 7:
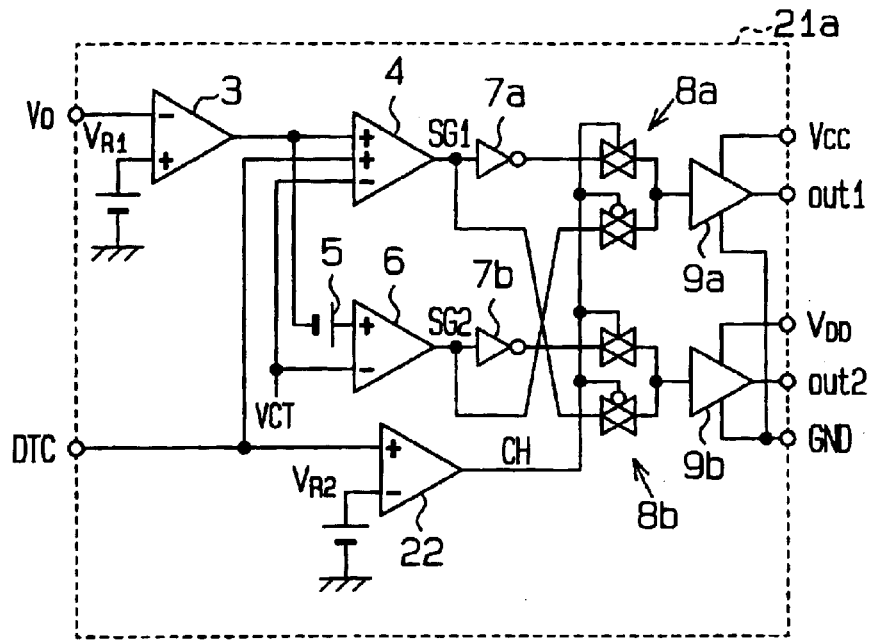
FIG. 7 is a schematic circuit diagram of a control circuit of a DC—DC converter according to a second embodiment of the present invention.

FIG. 7 is a schematic circuit diagram illustrating a control circuit 21a of a DC—DC converter according to a second embodiment of the present invention.

The control circuit 21a includes an error detection amplifier 3, a first PWM comparator 4, a voltage shift circuit 5, a second PWM comparator 6, inverter circuits 7a, 7b, switch circuits 8a, 8b, drive circuits 9a, 9b, and a comparator 22.

The comparator 22 includes a plus input terminal, which receives the duty setting signal DTC, and a minus input terminal, which receives a reference voltage VR2. The comparator 22 compares the duty setting signal DTC and the reference voltage VR2 to generate a switching signal CH.

When the control circuit 21a is connected to the step-down circuit 2, the voltage of the duty setting signal DTC is greater than the maximum voltage of the triangular wave signal VCT like in the prior art. Further, when the control circuit 21a is connected to the step-up circuit 10, the voltage of the duty setting signal DTC is about 70% of the maximum voltage of the triangular wave signal VCT.

The reference voltage VR2 is set at a median value between the maximum voltage of the triangular wave signal VCT and a voltage corresponding to about 70% of the maximum voltage. When the control circuit 21a is connected to the step-down circuit 2, the comparator 22 is provided with the duty setting signal DTC, the voltage of which is greater than or equal to the maximum voltage of the triangular wave signal VCT. Accordingly, the comparator 22 generates the switching signal CH at a high level. When the control circuit 21a is connected to the step-up circuit 10, the comparator 22 is provided with the duty setting signal DTC, the voltage of which is about 70% of the maximum voltage of the triangular wave signal. Accordingly, the comparator 22 generates the switching signal CH at a low level. The switching signal CH of the comparator 22 is provided to the switch circuits 8a, 8b. The switch circuits 8a, 8b respond to the switching signal CH and function in the same manner as in the prior art.

When output terminals out1, out2 of the control circuit 21a are connected to the step-down circuit 2, the duty setting signal DTC, the voltage of which is greater than or equal to the maximum voltage of the triangular wave signal VCT, is provided to the comparator 22, and the comparator 22 outputs the switching signal CH at a high level. As a result, the output signal of the inverter circuit 7a is provided to the drive circuit 9a, and the output signal of the inverter circuit 7b is provided to the drive circuit 9b. In this manner, the control circuit 21a controls the step-down circuit 2 in the same manner as in the prior art.

When the output terminals out1, out2 of the control circuit 21a are connected to the step-up circuit 10, the duty setting signal DTC, the voltage of which is about 70% of the maximum voltage of the triangular wave signal VCT, is provided to the comparator 22, and the comparator 22 outputs the switching signal CH at a high level. As a result, the comparison output signal SG1 of the first PWM comparator 4 is provided to the drive circuit 9b, and the comparison output signal SG2 of the second PWM comparator 6 is provided to the drive circuit 9a. In this manner, the control circuit 21a controls the step-up circuit 10 in the same manner as in the prior art.

The control circuit 21 of the DC—DC converter according to the second embodiment has the advantages described below.

(1) The step-down circuit and the step-up circuit are selectively controlled by generating the switching signal CH with the duty setting signal DTC and operating the switch circuits 8a, 8b in response to the switching signal CH.

(2) The switching signal CH, which controls the switch circuits 8a, 8b, does not have to be provided from an external device. This reduces the number of external terminals.

Figure 8:
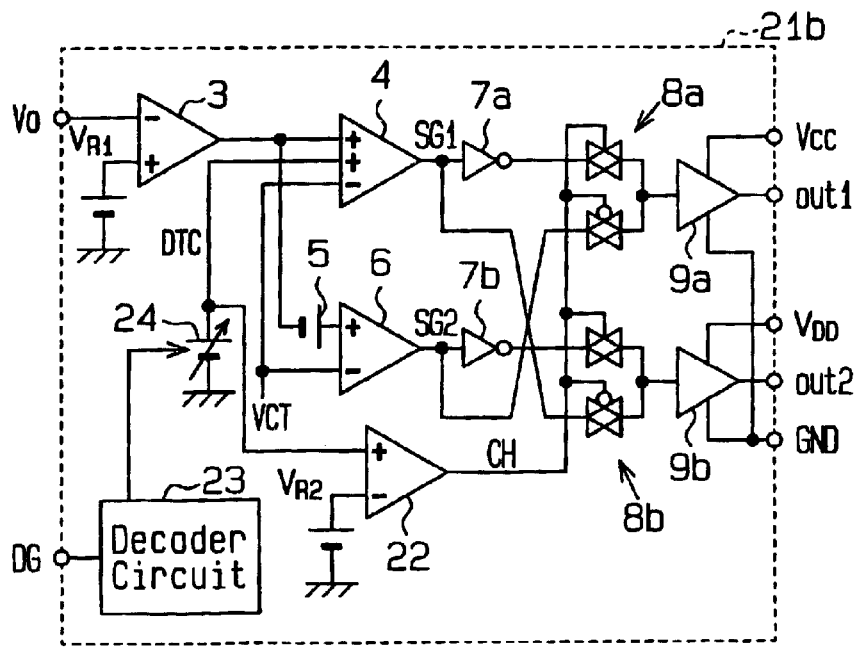
FIG. 8 is a schematic circuit diagram of a control circuit of a DC—DC converter according to a third embodiment of the present invention.

FIG. 8 is a schematic circuit diagram of a control circuit 21b according to a third embodiment of the present invention. The control circuit 21b includes a decoder circuit 23, which receives a digital data signal from an external device and uses the digital data signal to generate the duty setting signal DTC. In other words, the decoder circuit 23 receives the digital setting signal DG, which has multiple bits, from an external device, decodes the digital setting signal DG, and generates a decoded signal. The decoded signal is provided to an analog voltage generation circuit 24.

The analog voltage generation circuit 24 includes, for example, a resistor ladder circuit (not shown), which has a plurality of resistors, and a plurality of switch circuits (not shown), which are connected between a common output terminal and terminals of the resistors. By opening and closing each switch circuit with the decoded signal, the duty setting signal DTC, which is an analog signal, is output from the output terminal.

When the control circuit 21b is connected to a step-down circuit, the duty setting signal DTC is generated at a voltage that is greater than or equal to the maximum voltage of the triangular wave signal VCT. When the control circuit 21b is connected to a step-up circuit, the duty setting signal DTC is generated at a voltage that is about 70% of the maximum value of the triangular wave signal VCT. The duty setting signal DTC is provided to the comparator 22. The comparator 22 generates the switching signal CH using the duty setting signal DTC.

Figure 9:
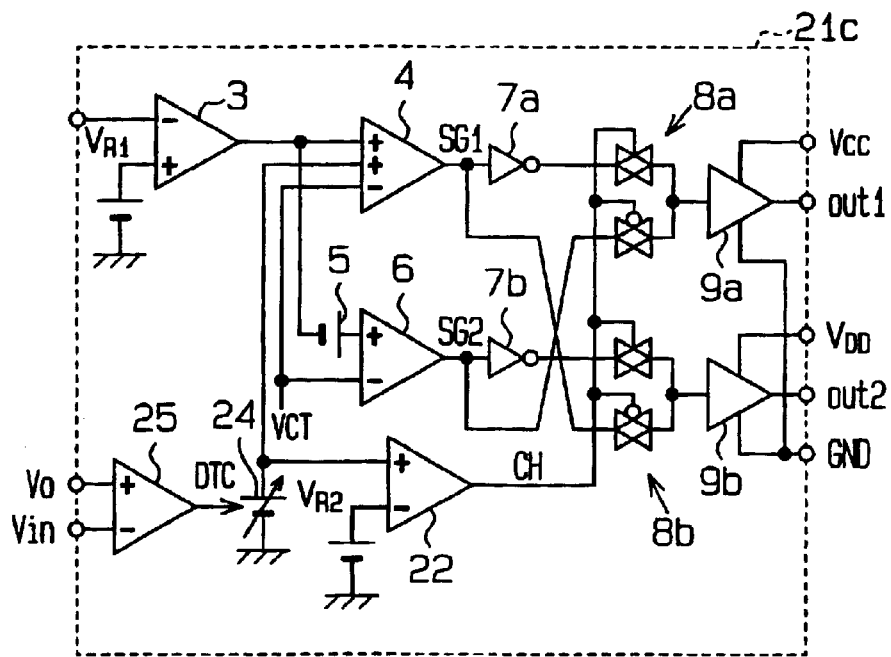
FIG. 9 is a schematic circuit diagram of a control circuit of a DC—DC converter according to a fourth embodiment of the present invention.

FIG. 9 is a schematic block diagram of a control circuit 21c according to a fourth embodiment of the present invention. The control circuit 21c includes a comparator 25 for controlling an analog voltage generation circuit 24 based on the comparison between the input voltage Vin and the output voltage Vo of a step-down circuit or a step-up circuit. The remaining configuration of the control circuit 21c is identical to that of the control circuit 21b in the third embodiment.

The comparator 25 compares the input voltage Vin and the output voltage Vo and provides an output signal, which indicates the comparison result, to the analog voltage generation circuit 24. The comparator 25 generates an output signal at a low level when receiving the output voltage Vo of the step-down circuit and generates an output signal at a high level when receiving the output voltage Vo of the step-up circuit.

The analog voltage generation circuit 24 generates the duty setting signal DTC of the step-down circuit in response to the low output signal from the comparator 25. Further, the analog voltage generation circuit 24 generates the duty setting signal DTC of the step-up circuit in response to the high output signal from the comparator 25.

In this manner, the control circuit 21c generates the duty setting signal DTC using the input voltage Vin and the output voltage Vo and generates the switching signal CH using the duty setting signal DTC. Thus, the control circuit 21c does not have to receive the switching signal CH from an external device. This reduces the number of external terminals.

Figure 10:
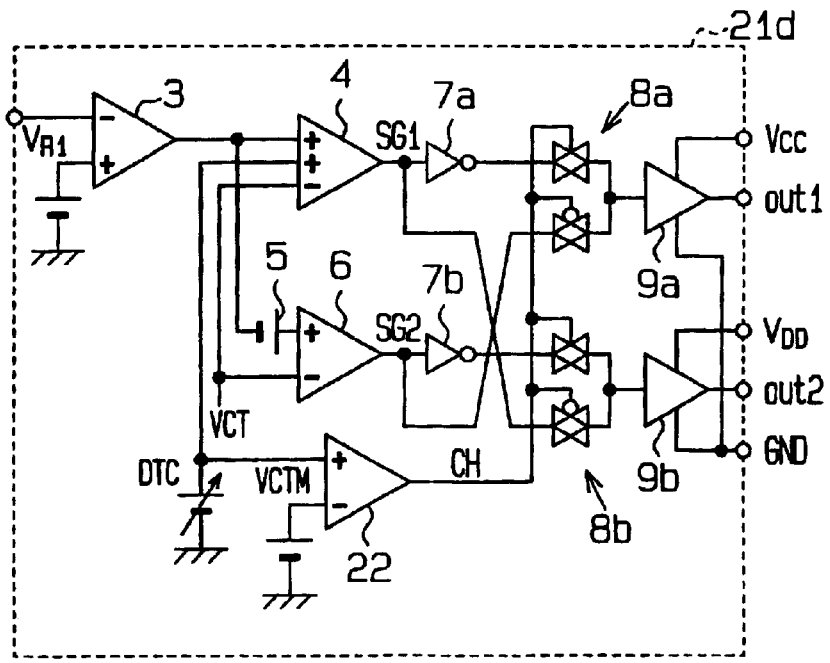
FIG. 10 is a schematic circuit diagram of a control circuit of a DC—DC converter according to a fifth embodiment of the present invention.

FIG. 10 is a schematic circuit diagram of a control circuit 21d according to a fifth embodiment of the present invention. The control circuit 21d includes a comparator 22, which has a minus input terminal provided with a maximum voltage VCTM in lieu of the reference voltage VR2. When the control circuit 21d is connected to the step-down circuit 2, the plus input terminal of the comparator 22 is provided with the duty setting signal DTC, the voltage of which exceeds the maximum voltage of the triangular wave signal VCT. When the control circuit 21d is connected to the step-up circuit 10, the voltage of the duty setting signal DTC provided to the plus input terminal of the comparator 22 is about 70% of the maximum voltage of the triangular wave signal VCT.

The duty setting signal DTC may be provided from an external device in the same manner as in the second embodiment. Alternatively, in the same manner as in the third embodiment, the duty setting signal DTC may be generated by the decoder circuit 23 using a setting signal (decoded signal) that is provided from an external device.

Figure 11:
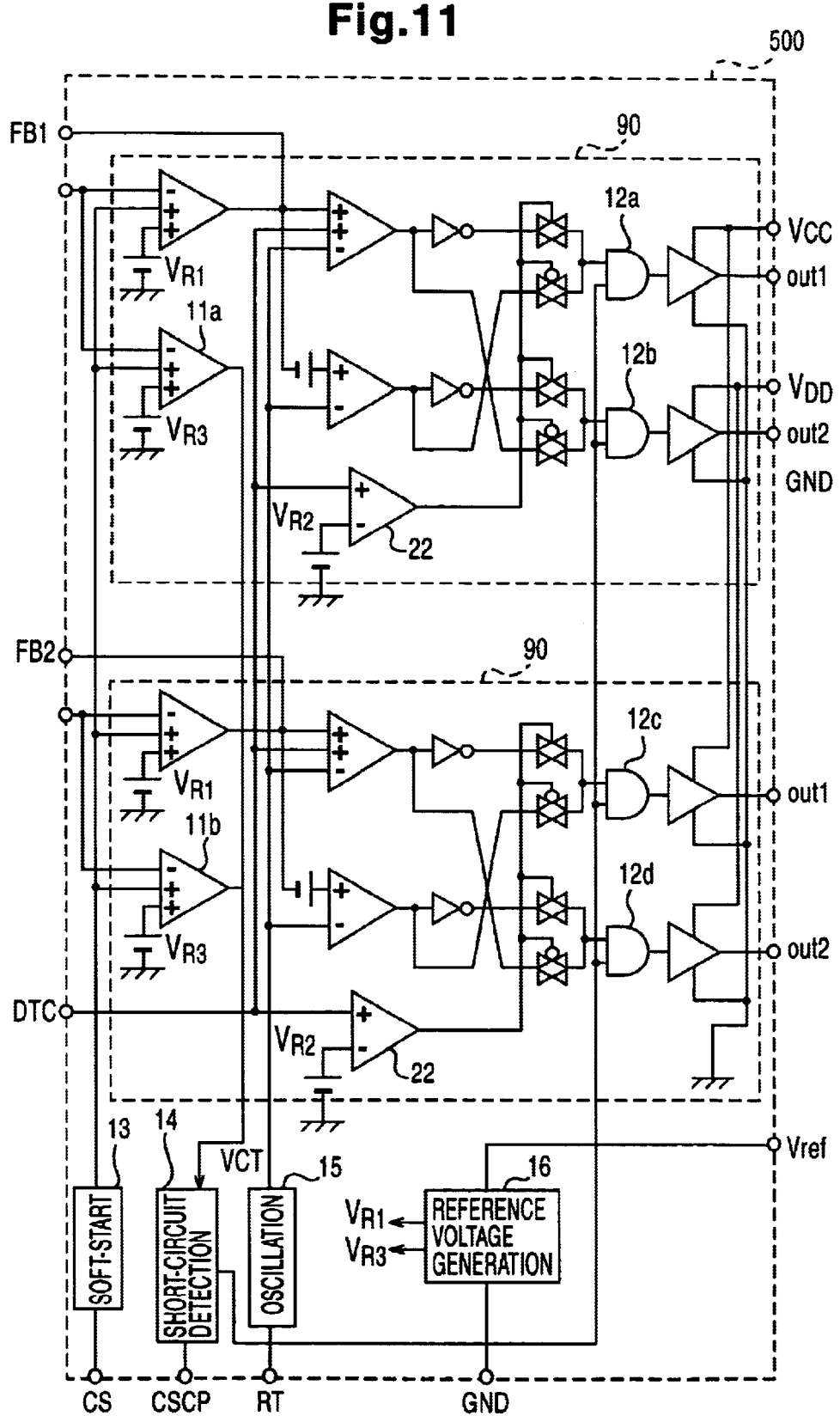
FIG. 11 is a schematic circuit diagram of a control circuit of a DC—DC converter according to a sixth embodiment of the present invention.

FIG. 11 is a schematic circuit diagram illustrating a schematic circuit diagram of a control unit 500 according to a sixth embodiment of the present invention. The control unit 500 includes two control circuits 90. Each control circuit 90 has a comparator 22 like the control circuit 21a. Accordingly, the control unit 500 does not require an external terminal to receive the switching signal CH. That is, the number of external terminals in the control unit 500 is two less than the prior art control unit 300. An increase in the number of the control circuits 90 to configure a multi-channel control unit would further decrease the number of external terminals.

Further, the control unit 500 may be used in a two-channel step-down DC—DC converter or a two-channel step-up DC—DC converter by switching the duty setting signal DTC.

Additionally, each control circuit 90 may separately be provided with the duty setting signal DTC to use one of the control circuits 90 for a step-up circuit and the other one of the control circuits 90 for a step-down circuit or to use both control circuits 90 for a step-down circuit or a step-up circuit.

It should be apparent to those skilled in the art that the present invention may be embodied in many other specific forms without departing from the spirit or scope of the invention. Particularly, it should be understood that the present invention may be embodied in the following forms.

In the first to fourth embodiments, the voltage of the duty setting signal DTC when performing step-down control may be equal to the maximum voltage of the triangular wave signal VCT. Further, the voltage of the duty setting signal DTC when performing step-up control does not have to be 70 percent of the maximum voltage of the triangular wave signal VCT. In this case, the reference voltage VR2 may be set as required based on the duty setting signal.

The present examples and embodiments are to be considered as illustrative and not restrictive, and the invention is not to be limited to the details given herein, but may be modified within the scope and equivalence of the appended claims.

What is claimed is:

1. A control circuit of a DC—DC converter that generates either one of a step-down control signal and a step-up control signal, the control circuit comprising:

a switch circuit for outputting the step-down control signal in response to a first switching signal and outputting the step-up control signal in response to a second switching signal; and a switching signal generation circuit connected to the switch circuit for selectively generating the first and second switching signals using a duty setting signal, which controls either one of the step-down control signal and the step-up control signal, wherein the switching signal generation circuit includes a comparator for comparing the duty setting signal with a reference voltage including the maximum voltage of a triangular wave signal, and wherein, based on a comparison result, the comparator generates the first switching signal when the duty setting signal represents a step-down operation and generates the second switching signal when the duty setting signal represents a step-up operation.

2. The control circuit according to claim 1, wherein the reference voltage includes a median voltage between the maximum voltage of the triangular wave signal and a voltage corresponding to a predetermined percent of the maximum voltage, and wherein the comparator compares the voltage of the duty setting signal with the median voltage.

3. The control circuit according to claim 1, further comprising:

a duty setting signal generation circuit for generating the duty setting signal in accordance with a digital setting signal.

4. The control circuit according to claim 3, wherein the duty setting signal generation circuit includes:
   a decoder circuit for decoding the digital setting signal to generate a decoded signal; and
   an analog voltage generation circuit connected to the decoder circuit for generating the duty setting signal in accordance with the decoded signal.

5. The control circuit according to claim 3, wherein the duty setting signal generation circuit includes:
   a comparator for comparing an input voltage and an output voltage of the DC—DC converter to generate a comparison signal; and
   an analog voltage generation circuit connected to the comparator for generating the duty setting signal in accordance with the comparison signal.

6. A control circuit of a DC—DC converter comprising:
   a first PWM comparator for comparing an input signal, a duty setting signal, and a triangular wave signal to generate either one of a first step-down control signal and a first step-up control signal;
   a second PWM comparator for comparing the input signal and the triangular wave signal to generate either one of a second step-down control signal and a second step-up control signal;
   a switch circuit connected to the first and second PWM comparators for outputting the first and second step-down control signals in response to a first switching signal and outputting the first and second step-up control signals in response to a second switching signal; and
   a switching signal generation circuit connected to the switch circuit for selectively generating the first and second switching signals using the duty setting signal, wherein the switching signal generation circuit includes a comparator for comparing the duty setting signal with a reference voltage including the maximum voltage of the triangular wave signal, and wherein, based on a comparison result, the comparator generates the first switching signal when the duty setting signal represents a step-down operation and generates the second switching signal when the duty setting signal represents a step-up operation.

7. The control circuit according to claim 6, wherein reference voltage includes a median voltage between the maximum voltage of the triangular wave signal and a voltage corresponding to a predetermined percent of the maximum voltage, and wherein the comparator compares the voltage of the duty setting signal with the median voltage.

8. The control circuit according to claim 6, further comprising:
   a duty setting signal generation circuit for generating the duty setting signal in accordance with a digital setting signal.

9. The control circuit according to claim 8, wherein the duty setting signal generation circuit includes:
   a decoder circuit for decoding the digital setting signal to generate a decoded signal; and
   an analog voltage generation circuit connected to the decoder circuit for generating the duty setting signal in accordance with the decoded signal.

10. The control circuit according to claim 8, wherein the duty setting signal generation circuit includes:
    a comparator for comparing an input voltage and an output voltage of the DC—DC converter to generate a comparison signal; and
    an analog voltage generation circuit connected to the comparator for generating the duty setting signal in accordance with the comparison signal.

11. A DC—DC converter including a step-down circuit for decreasing an input voltage to generate a step-down output voltage or a step-up circuit for increasing the input voltage to generate a step-up output voltage, the DC—DC converter comprising:
    a control circuit connected to the step-down circuit or the step-up circuit for generating either one of a step-down control signal, which controls the step-down circuit, or a step-up control signal, which controls the step-up circuit, wherein the control circuit includes;
       a switch circuit for outputting the step-down control signal in response to a first switching signal and outputting the step-up control signal in response to a second switching signal; and
       a switching signal generation circuit connected to the switch circuit for selectively generating the first and second switching signals using a duty setting signal, which controls the duty of either one of the step-down control signal and the step-up control signal, wherein the switching signal generation circuit includes a comparator for comparing the duty setting signal with a reference voltage including the maximum voltage of a triangular wave signal, and wherein, based on a comparison result, the comparator generates the first switching signal when the duty setting signal represents a step-down operation and generates the second switching signal when the duty setting signal represents a step-up operation.

12. The DC—DC converter according to claim 11, wherein the reference voltage includes a median voltage between the maximum voltage of the triangular wave signal and a voltage corresponding to a predetermined percent of the maximum voltage, and wherein the switching signal generation circuit compares the voltage of the duty setting signal with the median voltage.

13. The DC—DC converter according to claim 11, wherein the control circuit further includes:
    a duty setting signal generation circuit for generating the duty setting signal in accordance with a digital setting signal.

14. The DC—DC converter according to claim 13, wherein the duty setting signal generation circuit includes:
    a decoder circuit for decoding the digital setting signal to generate a decoded signal; and
    an analog voltage generation circuit connected to the decoder circuit for generating the duty setting signal in accordance with the decoded signal.

15. The DC—DC converter according to claim 13, wherein the duty setting signal generation circuit includes:
    a comparator for comparing an input voltage and an output voltage of the DC—DC converter to generate a comparison signal; and an analog voltage generation circuit connected to the comparator for generating the duty setting signal in accordance with the comparison signal.

16. A method for controlling a DC—DC converter including a step-down circuit or a step-up circuit, the method comprising the steps of:

generating either one of a step-down control signal, which controls the step-down circuit, or a step-up control signal, which controls the step-up circuit;

comparing a duty setting signal with a reference voltage including the maximum voltage of a triangular wave signal, wherein the duty setting signal controls the duty of either one of the step-down control signal and the step-up control signal;

generating a first switching signal for selecting the step-down control signal when the duty setting signal represents a step-down operation based on a comparison result;

generating a second switching signal for selecting the step-up control signal when the duty setting signal represents a step-up operation based on the comparison result;

providing the step-down control signal to the step-down circuit in response to the first switching signal; and providing the step-up control signal to the step-up circuit in response to the second switching signal.

* * * * *